United States Patent
Hossayni et al.

(10) Patent No.: US 11,972,357 B2
(45) Date of Patent: Apr. 30, 2024

(54) APPLICATION PROGRAMMING INTERFACE ENABLEMENT OF CONSISTENT ONTOLOGY MODEL INSTANTIATION

(71) Applicant: Schneider Electric USA, Inc., Andover, MA (US)

(72) Inventors: Hicham Hossayni, Grenoble (FR); Imran Khan, Grenoble (FR); Noel Crespi, Vernon (FR)

(73) Assignee: Schneider Electric USA, Inc., Andover, MA (US)

(*) Notice: Subject to any disclaimer, the term of this patent is extended or adjusted under 35 U.S.C. 154(b) by 119 days.

(21) Appl. No.: 17/360,923

(22) Filed: Jun. 28, 2021

(65) Prior Publication Data

US 2022/0414481 A1 Dec. 29, 2022

(51) Int. Cl.
| | | |
|---|---|---|
| *G06F 16/36* | (2019.01) | |
| *G06F 8/70* | (2018.01) | |
| *G06F 40/30* | (2020.01) | |
| *G06N 5/022* | (2023.01) | |

(52) U.S. Cl.
CPC .............. *G06N 5/022* (2013.01); *G06F 8/70* (2013.01); *G06F 16/367* (2019.01); *G06F 40/30* (2020.01)

(58) Field of Classification Search
CPC ....... G06N 5/022; G06F 16/367; G06F 40/30; G06F 8/70
See application file for complete search history.

(56) References Cited

U.S. PATENT DOCUMENTS

| | | | | |
|---|---|---|---|---|
| 6,199,195 | B1* | 3/2001 | Goodwin | G06F 8/35 |
| | | | | 707/999.1 |
| 2008/0172360 | A1* | 7/2008 | Lim | G06F 16/24564 |
| 2008/0215542 | A1* | 9/2008 | Lim | G06F 16/2433 |
| 2009/0300002 | A1* | 12/2009 | Thomas | G06F 16/2457 |
| | | | | 707/999.005 |

(Continued)

OTHER PUBLICATIONS

Kharlamov et al., Capturing Industrial Information Models with Ontologies and Constraints, 2016 (Year: 2016).*

(Continued)

*Primary Examiner* — Matthew J Ellis
(74) *Attorney, Agent, or Firm* — Locke Lord LLP

(57) ABSTRACT

A method is provided for an application program interface (API) to interface with an ontology store storing a plurality of modifiable ontology models having associated dynamic definitions associated that define classes of the associated ontology model and relationships between the respective classes and that is modifiable over time. The method includes receiving from a requesting entity a request that specifies an ontology model and one or more parameters defining attributes of an instantiated ontology object, accessing the ontology store, identifying an ontology model in the ontology store that corresponds to the ontology model specified, and manipulating the identified ontology model based on its one or more parameters. The method further includes generating a semantics query for accessing the identified ontology model based on the one or more parameters specified in the request, submitting the semantics query to and receiving query results from the ontology store, and returning the query results to the requesting entity.

20 Claims, 7 Drawing Sheets

(56) References Cited

U.S. PATENT DOCUMENTS

| | | | | |
|---|---|---|---|---|
| 2010/0070448 | A1* | 3/2010 | Omoigui | H01L 27/1463 706/55 |
| 2018/0288098 | A1* | 10/2018 | Wang | G06F 16/9024 |
| 2020/0034480 | A1* | 1/2020 | Kazmaier | G06F 16/367 |
| 2020/0192727 | A1* | 6/2020 | Savenkov | G06F 9/547 |
| 2022/0253474 | A1* | 8/2022 | Acharya | G06F 16/367 |

OTHER PUBLICATIONS

13. KaedCharbel Eletal:"ASemanticBasedMulti-PlatformIoTIntegrationApproachfromSensorstoChatbots",2018, GlobalInternetofThingsSummit(GIOTS), IEEE,Jun. 4, 2018(Jun. 4, 2018), pp. 1-6, XP033446951, Doi:10.1109/GIOTS.2018.8534520[retrievedonNov. 13, 2018]. (Year: 2018).*

Bonomi, A., et al., "An Ontology Driven Web Site and its Application in the Archaeological Context", Department of Computer Science, Systems and Communication (DISCo), University of Milan-Bicocca, Department of Prehistory, Ancient History and Archaeology, Barcelona University; sebstride@yahoo.com (2009).

Kharlamov, E., et al."Capturing Industrial Information Models with Ontologies and Constraints", University of Oxford, UK, Siemens AG, Corporate Technology, Germany (2018).

Extended European Search report for European Patent Application No. EP22174246.3, dated Nov. 7, 2022.

Kaed Charbel El et al: "A Semantic Based Multi-Platform IoT Integration Approach from Sensors to Chatbots", 2018 Global Internet of Things Summit (GIOTS), IEEE, Jun. 4, 2018 (Jun. 4, 2018), pp. 1-6, XP033446951, DOI: 10.1109/GIOTS.2018.8534520 [retrieved on Nov. 13, 2018].

* cited by examiner

APPLICATION PROGRAMMING INTERFACE ENABLEMENT OF CONSISTENT ONTOLOGY MODEL INSTANTIATION

TECHNICAL FIELD

The present disclosure relates to an interface to a store of ontology models, and more particularly, to an application programming interface (API) for interfacing with a dynamic store of ontology models to achieve consistent ontology model instantiation.

BACKGROUND

An ontology model is defined by classes and relationships between the classes. Domain and ontology experts define ontology models. The definition, also known as TBox, enumerates classes and provides constraints, wherein the constraints define, for each enumerated class, structure and properties of the class, data types permitted for the class, cardinality restrictions for the properties, and relationships between classes. Developers that build applications can use libraries such as Ontology Library GenerAtor (Olga) to access the ontology definition to instantiate ontology models (also referred to as updating the ontology model's Abox) and store them in an ontology store, such as a resource definition framework (RDF) store. Developers can also develop applications that query ontology models that are already stored in the ontology store. However, when an ontology definition is updated by an expert, such as by adding classes to the ontology definition, the library becomes obsolete and a new library version needs to be manually (as opposed to being automatically) generated. When using the new library version, developers may not be aware of the updates to the ontology definition. Applications that were previously built may need to be updated in order to interact with an updated ontology definition in the new library version to be compliant with the updates to the ontology definition.

In order to interact with the ontology store, developers of applications are expected to have a level of expertise in a semantics query language, such as Sparql Using the semantics query language, the developer can build applications to retrieve and manipulate data stored in the ontology store, e.g., in RDF format. The expectation of expertise in the semantics query language can thwart developers without this expertise from utilizing the ontology store and drive up the cost of application development that relies on this expertise. Furthermore, a developer may seek to build applications that can access multiple ontologies that have different corresponding ontology definitions, requiring further developer expertise in each of these ontologies.

Ontology stores includes reasoning engines that check requests for consistency. However, reasoning engines are cumbersome, meaning they consume a large amount of memory, processing resources, and energy resources. This potentially results in a cumbersome ontology store that is not suitable to be used in an embedded device or a gateway to a system (e.g., a home, vehicle, or office network). With the increased usage of 5G capabilities, such as in the internet-of-things, cumbersome ontology stores may not be suitable.

While conventional methods and systems have generally been considered satisfactory for their intended purpose, there is still a need in the art for improved access to ontology stores that decreases the level of expertise needed to interact with the ontology store and provides access to multiple ontologies. In addition, there is still a need in the art for an improved ontology store that uses a reduced amount of resources, e.g., to be suitable for a small device (e.g., embedded device or gateway) and/or to be suitable for a battery-powered device. The present disclosure provides a solution.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a computer-implemented method for interfacing with an ontology store, the method includes receiving, by an application program interface (API), from a requesting entity, a request that specifies an ontology model and one or more parameters defining attributes of an instantiated ontology object and accessing the ontology store via the API. The ontology store stores a plurality of ontology models, the ontology store further stores in association with each ontology model a dynamic definition that is modifiable over time, wherein the definition defines classes of the ontology model and relationships between the respective classes. The method further includes identifying by the API an ontology model in the accessed ontology store that corresponds to the ontology model specified, manipulating by the API the identified ontology model based on the identified ontology model's one or more parameters, and generating a semantics query for accessing the ontology model that was identified, wherein the semantics query is based on the one or more parameters specified in the request. The method further includes submitting the semantics query to and receiving query results from the ontology store and returning the query results to the requesting entity.

In one or more embodiments, the request received can be a request to access one or more classes and/or objects of the ontology model specified by the ontology model and the one or more parameters, and manipulating the ontology model by the API can include using the request to identify one or more instantiated classes and/or objects that correspond to the ontology model and the one or more parameters specified by the request.

In one or more embodiments, the request received can be a request to update one or more of classes, constraints, and/or data of the identified ontology model based on the ontology model and the one or more parameters specified by the request, and manipulating the identified ontology model by the API can include determining whether the identified ontology model and the one or more parameters specified by the request are consistent, wherein submitting the semantics query to the ontology store is performed only upon determining that the identified ontology model and the one or more parameters specified by the request are consistent.

In one or more embodiments, the one or more parameters specified by the request can include one or more specified classes, specified properties of the one or more specified classes, types of data associated with the specified ontology model, and cardinality of multiple classes of the one or more specified classes. Determining whether the request and the identified ontology model are consistent can include accessing the definition associated with the identified ontology model and determining at least one of whether the one or more specified classes exist in the identified ontology model, whether the specified properties of the one or more specified classes are compliant with properties of the classes of the identified ontology model, whether the specified types of data stored of the specified ontology model are compliant with types of data associated with the identified ontology model, and whether cardinality of multiple classes of the one or more specified classes is compliant with cardinality of multiple classes of the identified ontology model.

In one or more embodiments, the ontology store can receive an update to the definition of one or more of the plurality of ontology models stored in the ontology store and/or an addition of an ontology definition to the ontology store. In response to a request to access the specified ontology model and/or populate the specified ontology model, the API can extract the definition related to the identified ontology model.

In one or more embodiments, the semantics query can be a Sparql query and the semantics query can be submitted to a Sparql endpoint of the ontology store.

In one or more embodiments, the request received by the API can be formatted in natural language.

In one or more embodiments, at least one of the ontology store and the API can be executed by one or more embedded devices.

In one or more embodiments, the method can further include executing the API by a web server or a personal device.

In one or more embodiments, the method can further include receiving at least one semantic query template by the API from an expert entity, each template of the at least one template being configured to be consistent with a definition of a corresponding ontology model, wherein the template has placeholders configured to allow only parameters consistent with the corresponding ontology model to be inserted into the placeholders. The method can further include selecting a semantic query template from the at least one semantic query template that is consistent with the definition of the identified ontology module, and inserting the one or more parameters into the selected semantic query template as allowed by the template. Submitting the semantics query to the ontology store can include submitting to the ontology store the selected semantic template with the one or more parameters inserted.

In one or more embodiments, the method can further include converting the query results to an open standard file format and/or data interchange format, and the query results can be returned to the requested entity as converted.

In a further aspect of the disclosure, an interface system is provided. The interface system includes a memory configured to store a plurality of programmable instructions and a processing device in communication with the memory. The processing device, upon execution of the plurality of programmable instructions is configured to receive from a requesting entity a request that specifies an ontology model and one or more parameters defining attributes of an instantiated ontology object and access the ontology store. The ontology store stores a plurality of ontology models and further stores in association with each ontology model a dynamic definition that is modifiable over time, wherein the definition defines classes of the ontology model and relationships between the respective classes. The processing device, upon execution of the plurality of programmable instructions is further configured to identify an ontology model in the accessed ontology store that corresponds to the ontology model specified, manipulate the identified ontology model based on the identified ontology model's one or more parameters, generate a semantics query for accessing the ontology model that was identified, wherein the semantics query is based on the one or more parameters specified in the request, submit the semantics query to the ontology store, receive query results for the semantics query from the ontology store, and return the query results to the requesting entity.

In one or more embodiments, the request received can be a request to access one or more classes and/or objects of the ontology model specified by the ontology model and the one or more parameters, and manipulating the ontology model can include using the request to identify one or more instantiated classes and/or objects that correspond to the ontology model and the one or more parameters specified by the request.

In one or more embodiments, the request received can be a request to update one or more of classes, constraints, and/or data of the identified ontology model based on the ontology model and the one or more parameters specified by the request, and manipulating the identified ontology model can include determining whether the identified ontology model and the one or more parameters specified by the request are consistent. Submitting the semantics query to the ontology store can be performed only upon determining that the identified ontology model and the one or more parameters specified by the request are consistent.

In one or more embodiments, the one or more parameters specified by the request can include one or more specified classes, specified properties of the one or more specified classes, types of data associated with the specified ontology model, and cardinality of multiple classes of the one or more specified classes. Determining whether the request and the identified ontology model are consistent can include accessing the definition associated with the identified ontology model and determining at least one of whether the one or more specified classes exist in the identified ontology model, whether the specified properties of the one or more specified classes are compliant with properties of the classes of the identified ontology model, whether the specified types of data stored of the specified ontology model are compliant with types of data associated with the identified ontology model, and whether cardinality of multiple classes of the one or more specified classes is compliant with cardinality of multiple classes of the identified ontology model.

In one or more embodiments, the ontology store can receive an update to the definition of one or more of the plurality of ontology models stored in the ontology store and/or an addition of an ontology definition to the ontology store, wherein in response to a request to access the specified ontology model and/or populate the specified ontology model, the processing device, upon execution of the plurality of programmable instructions can be configured to extract the definition related to the identified ontology model.

In one or more embodiments, the ontology store can be executed by one or more embedded devices and/or the processing system can be an embedded device.

In still a further aspect of the disclosure, an ontology store and a method of storing ontology models is provided. The ontology store includes a memory configured to store a plurality of programmable instructions and to store a plurality of ontology models. Each ontology model has an associated dynamic definition that is modifiable over time, wherein the definition defines classes of the ontology model and relationships between the respective classes. The ontology model further includes a processing device in communication with the memory, wherein the embedded processing device, upon execution of the plurality of programmable instructions is configured to receive a request for a definition associated with an ontology model identified in the request, respond to the request for the definition with the definition requested, receive a semantics query that is based on a consistency check performed using the requested definition, process the semantics query, and output a response to the semantics query as processed.

In one or more embodiments, the processing device, upon execution of the plurality of programmable instructions can be further configured to receive an update request with an updated version of a definition for an identified ontology model stored by the memory and store the updated version of the definition in association with the identified ontology model in response to the update request.

In one or more embodiments, the processing device can be a low-power embedded processing device.

In accordance with a further aspect of the disclosure a method for interfacing with an ontology store having a plurality of ontology models is provided. The method includes receiving by an API at least one semantic query template from an expert entity, each template of the at least one template being configured to be consistent with a definition of a corresponding ontology model of the plurality of ontology models, wherein the template has placeholders configured to allow only parameters consistent with the corresponding ontology model to be inserted into the placeholder. The method further includes receiving by the API, from a requesting entity, a request identifying an ontology model of the plurality of ontology modules and including at least one parameter, selecting a semantic query template from the at least one semantic query template that is consistent with the definition of the identified ontology module, inserting the at least one parameter received from the requesting entity into the selected semantic query template as allowed by the template, and submitting the selected semantic template with the at least one parameter inserted to the ontology store. In accordance with still a further aspect of the disclosure, a non-transitory computer readable storage medium having one or more computer programs embedded therein is provided for each of the disclosed methods, which when executed by a computer system, cause the computer system to perform the disclosed method.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
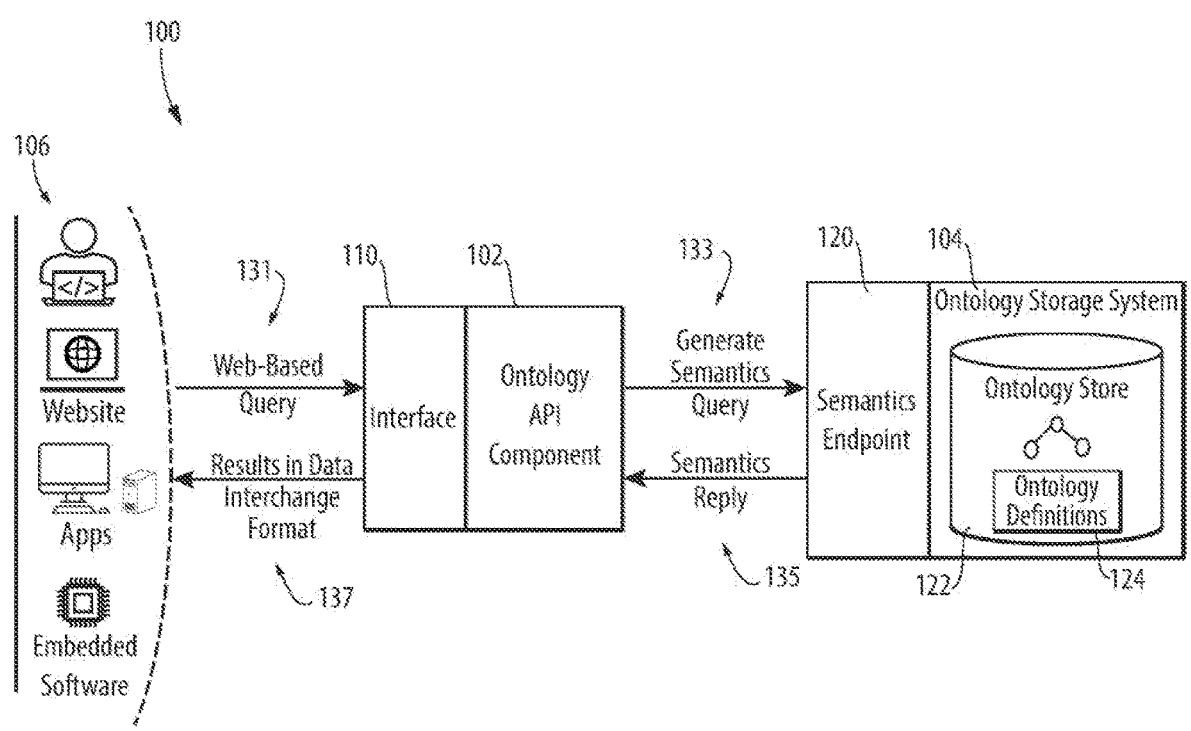
FIG. 1 is a block diagram illustrating an example ontology system, in accordance with embodiments of the disclosure.

Reference will now be made to the drawings wherein like reference numerals identify similar structural features or aspects of the subject disclosure. For purposes of explanation and illustration, and not limitation, a schematic diagram of an exemplary embodiment of an ontology system in accordance with the disclosure is shown in FIG. 1 and is designated generally by reference character 100. Other embodiments of an ontology system in accordance with the disclosure, or aspects thereof, are provided in FIGS. 2-7, as will be described.

Ontology system 100 is a computing system that includes an ontology application programming interface (API) 102 that communicates with an ontology system 104. Ontology API component 102 includes an interface 110 that receives application requests submitted by requesting devices 106. The requesting devices 106 can be computing devices operated by a user using an application developed by a developer, wherein the application submits the application request. In another scenario, the requesting devices 106 can be computing devices operated by developers, wherein the requesting devices 106 submit applications requests per instructions of the developer. Requesting devices 106 are computing devices used by developers, applications developed by the developers, and/or users of ontology storage system 104 (e.g., at communication link 131).

Ontology storage system 104 includes an ontology store 122 and a semantic endpoint 120. Ontology storage system 104 stores ontology models and an ontology definition of each of the ontology models. Semantic endpoint 120 provides an interface for receiving semantic queries (e.g., at communication link 133) and responding with semantic results (e.g., at communication link 135). Ontology API component 102 translates the semantic results into a data interchange format, such as JSON, XML, CSV, among others and replies with an application response that is in response to the application request. The application response includes the results as translated into the data interchange format (e.g., at communication link 137).

Ontology store 122 stores a plurality of ontology models that have been instantiated by ontology API component 102 or that have been otherwise instantiated. Ontology store 122 further stores in association with each ontology model an ontology definition that is dynamic, meaning it can be updated at any time (e.g., by an ontology or domain expert operating an expert device 204. The ontology definition, also known as TBox, enumerates classes of the ontology model and provides constraints, shown as classes and constraints 124. The constraints define, for each enumerated class, structure and properties of the class, permitted types of values and cardinality restrictions for the properties, and relationships between classes. Cardinality restrictions specify conditions for a number of values (e.g., a minimum, maximum, or an exact number) supported or required for each property.

Communication links 131, 133, 135, and 137 can include wired and/or wireless links and can be connected to a local area network (LAN) (such as an intranet, virtual private network (VPN), or enterprise network) or to a wide area network (WAN) (such as the Internet, etc.). In addition, communication links 131, 133, 135, and 137 can traverse the internet.

Each of ontology API component 102, semantics storage system 104, and developer devices 106 are computing devices that include at least memory configured to store programmable instructions, a processing device configured to execute the programmable instructions to perform the disclosed functions, interface(s) for communicating with other devices, and buses for communication between internal components. Each of these computing devices can be embodied as a personal computing device (e.g., laptop, desktop, or mobile (e.g., smartphone, tablet) computers) or a server. Ontology API component 102 and/or semantics storage system 104 can be embedded in a mechanical or electrical device, such as an appliance, an edge device, a gateway device, etc. The mechanical or electrical device housing the embedded device can be a low-power device, such as a fuel or battery powered device.

In one or more embodiments, ontology API component 102 (including interface 110) and semantic storage system 104 (including semantics endpoint 120 and ontology store 122) can be co-located and executed by the same computing device. In one or more embodiments, ontology API component 102 and semantic storage system 104 can be remote from one another and executed by different computing devices. When remote from semantic storage system 104, ontology API component 102 is configured with an IP address of the semantic storage system 104 for enabling remote access.

Figure 2:
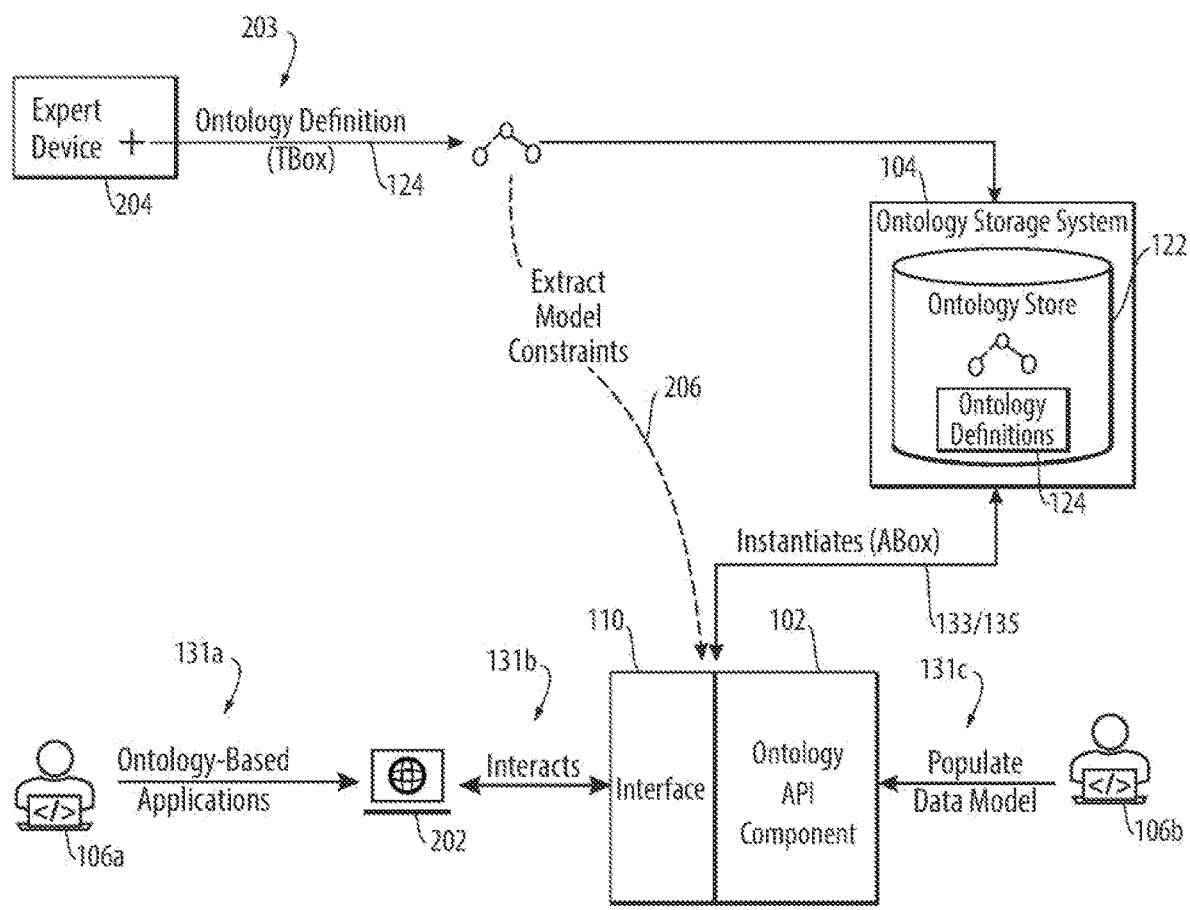
FIG. 2 is a conceptual flow diagram illustrating an example method of updating and using an ontology storage system, in accordance with embodiments of the disclosure.

With reference to FIG. 2, an example conceptual data flow is shown of an example method of updating and using ontology storage system 104. In a first scenario, developer device 106a provides an application developed by a developer to a webserver 202 via communication link 131a. In another scenario, developer device 106a is operated by a user that uses the application as hosted by webserver 202. The application hosted by webserver 202 can interact with ontology API component 102 by sending and receiving messages using Hypertext Transfer (or Transport) Protocol (HTTP) via interface 110. Interface 110 can be an interface that complies with an architectural style, such as Representational State Transfer (REST).

Ontology API component 102 receives application requests, interacts with ontology storage system 104 from requesting device 106a, processes the requests in coordination with ontology storage system 104, and sends responses from ontology storage system 104 to requesting device 106a. The application request can be a request to instantiate an ontology model or class or object of an existing model or update an ontology model (e.g., by creating an object of a class or assigning a value to an object), both of which are referred to as updating the ontology model's Abox. The application request can also be a query to access an ontology model and retrieve data stored in the model. The developer device 106a can alternatively communicate with interface 110 without using a web server 202 or the Internet (e.g., via an intranet or extranet), using a format that is compatible with ontology API component 102.

A requesting device 106b, as operated by a developer or user, can submit application requests to ontology API component 102 to populate an ontology module via communication link 131c by creating objects of classes or assigning values to objects in a stored ontology model. The created objects and their values or relations are part of the Abox. The requesting device 106b can communicate via a web server 202 using an interface of interface 110 that complies with the REST architecture (also referred to as being RESTful), or can communicate directly with interface 110 using a format that is compatible with ontology API component 102. Ontology API component 102 receives application requests and data from requesting device 106b and processes the application requests by interacting with ontology storage system 104. The requesting device 106a can alternatively communicate with interface 110 external to the Internet (e.g., via an intranet or extranet) using a format that is compatible with ontology API component 102.

The semantics queries transmitted by ontology API component 102 (via communication link 133) identify an ontology model and are used to query ontology store 122 regarding the ontology model, such as to request information about data stored in the ontology model or update the ontology model (e.g., by instantiating a class or an object of the ontology model). The application request can alternatively instantiate a new ontology model, which would not require identification of the ontology model.

Before submitting a semantics query, ontology API component 102 extracts the ontology definition associated with the ontology model and assures that the application request are consistent with the ontology model's ontology definition. Once the application request passes the consistency check, it formulates the application request into semantics request that is formatted to be compatible with the semantics endpoint 120 and submits the semantics request (via communication link 133) to ontology storage system 104. Upon receiving a semantics reply that is responsive to the semantics request (via communication link 135), ontology API component 102 translates the semantics request into a format that is compatible with requesting devices 106a and 106b. When the semantics query is to update the ontology model, the semantics reply may be a confirmation or may be omitted.

An example format is a data interchange format, such as JSON, XML, or CSV among others, that uses human-readable text to store and transmit data objects. Webserver 202, as is common with webservers, is compatible with JSON.

Expert device 204, which is a computing device operated by an ontology or domain expert, submits a definition request (e.g., via communication link 203) to ontology storage system 104 to add a definition for a new ontology model to ontology store 122 or to update an ontology definition of an existing ontology model already stored in ontology store 122. Communication link 203 can be wired or wireless, and can be connected to a network, such as a LAN or a WAN.

Ontology store 122 stores the new ontology definition, assigns a definition identifier to the new ontology definition, and associates the definition identifier to the corresponding ontology definition. The ontology definition can be communicated by ontology storage system 104 to expert device 204 as well as to ontology API component 102.

When ontology API component 102 receives an application request with a definition identifier, ontology API component 102 can use the definition identifier to look up the ontology definition, as is illustrated by conceptual path 206 (shown as a dotted line) and to access the associated ontology model if it already exists in ontology store 122. When a new ontology model is instantiated, it is stored in association with the definition identifier. Ontology API component 102 can continue to process application requests without a need for ontology API component 102 to be restarted or reconfigured. Furthermore, this holds true for ontology API component 102 even as ontology storage system 104 receives definition requests.

FIGS. 3-6 show exemplary and non-limiting flow diagrams illustrating a method for interfacing with an ontology store, in accordance with certain illustrated embodiments. The methods shown in FIGS. 3-6 can be performed, for example, by ontology API component 102. Before turning to the description of FIGS. 3-6, it is noted that the flow diagrams in FIGS. 3-6 shows examples in which operational blocks are carried out in a particular order, as indicated by the lines connecting the blocks, but the various blocks shown in these flowcharts can be performed in a different order, or in a different combination or sub-combination. It should be appreciated that in some embodiments some of the blocks described below may be combined into a single block. In some embodiments, one or more additional blocks may be included. In some embodiments, one or more of the blocks can be omitted.

Figure 3:
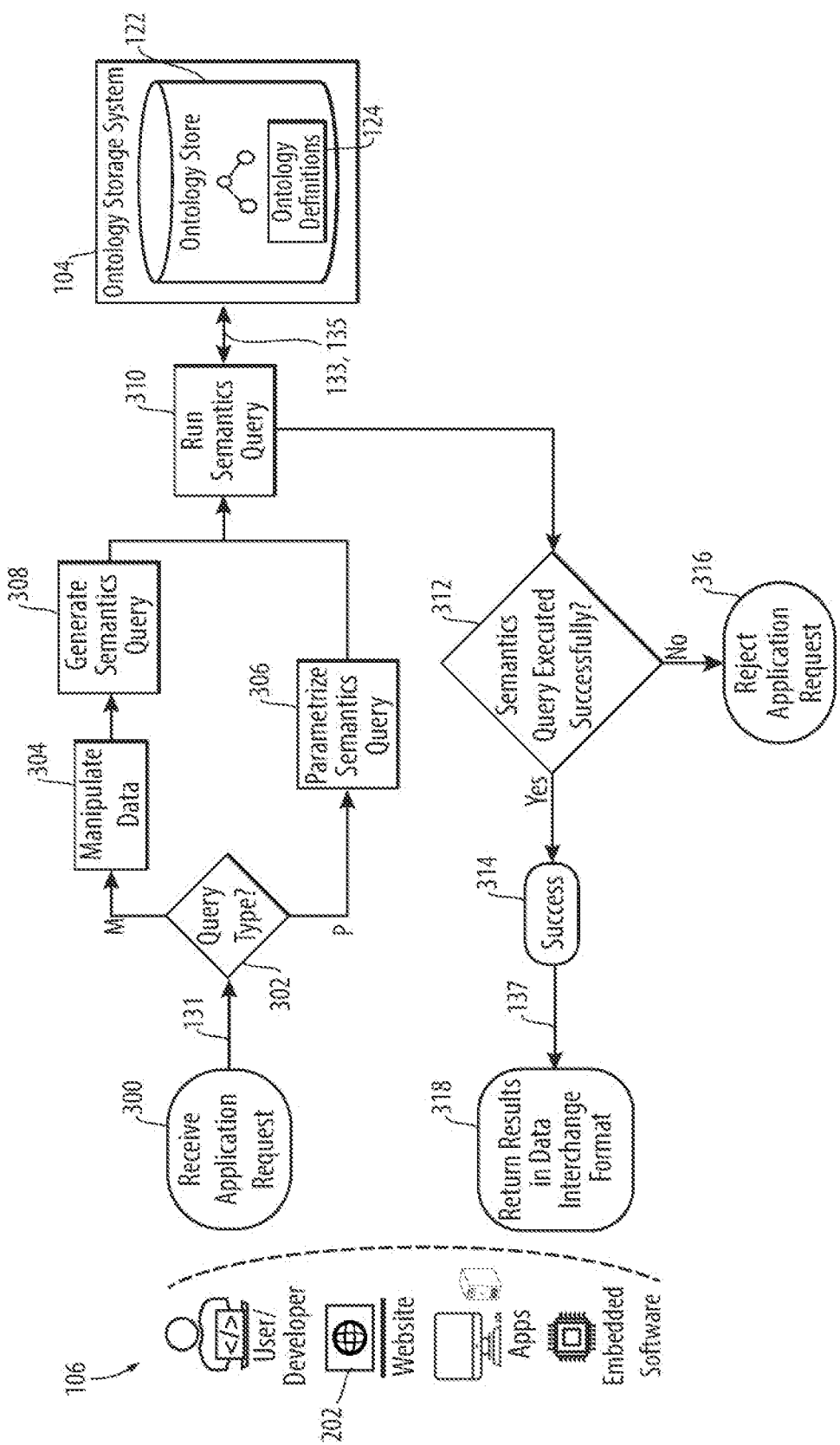
FIG. 3 is a flow diagram illustrating an example method of processing an application request, in accordance with embodiments of the disclosure.

With reference to FIG. 3, a flow diagram is shown of an example method of processing an application request. At block 302, application request is received from an application developed by a requesting device 106, e.g., via communication link 131. The application request can be output by any device executing the application, such as a webserver 202 hosting the application, the requesting device 106, an embedded device (e.g., in a smart device, such as thermostat, industrial machine, etc.), an edge device, a gateway device (such as a router, cable box, modem). The application request can be formatted as a transmission control protocol (TCP) (e.g., an HTTP request). At block 302, a determination is made regarding the type of application request received. If the application request is a type that requests data manipulation (shown as "M"), the method continues at block 304, which is shown and described in greater detail with regards to FIG. 4. If the application request is a type that requests parametrization of a semantics query (shown as "P", the method continues a block 306, which is shown and described in greater detail with regards to FIG. 5. The output from blocks 304 and 306 are provided to block 308.

At block 308, a semantics query is generated. The semantics query is formatted to query ontology store 122. In one or more embodiments, ontology store 122 is a triplestore, e.g., an RDF store, and the semantics query is provided in graph querying language, such as Sparql or GraphQL.

At block 310, the semantics query is caused to be executed by submitting the semantics query to semantics endpoint 120 of ontology storage system 104, e.g., via communication link 133. The semantics endpoint 120 can be, for example, a Sparql endpoint. The semantics endpoint 120 executes the semantics query by accessing ontology store 122 to perform an action requested by the semantics query, such as to instantiate or update an ontology model, class, or object or to retrieve data assigned to an object. A semantics reply is returned by semantics endpoint 120 and received at block 310, signifying completion of execution of the semantics query. The semantics reply includes an outcome of execution of the semantics query, such as a requested value obtained from ontology store 122 or confirmation of a requested instantiation in ontology store 122.

At block 312, a determination is made whether the semantics query was successfully executed. If it is determined at block 312 that the semantics query was not successfully executed, the method continues at block 316 at which the application request is rejected. If it is determined at block 312 that the semantics query was successfully executed, the method continues at block 314.

At block 314, the semantics reply is translated from the format used by ontology storage system 104 (e.g., Sparql) into an application response formatted in a format that is understood by requesting devices 106, such as a data interchange format, e.g., JSON. At block 318, the application response is returned to the requesting device 106 that submitted the application request, e.g., via communication link 137.

Figure 4:
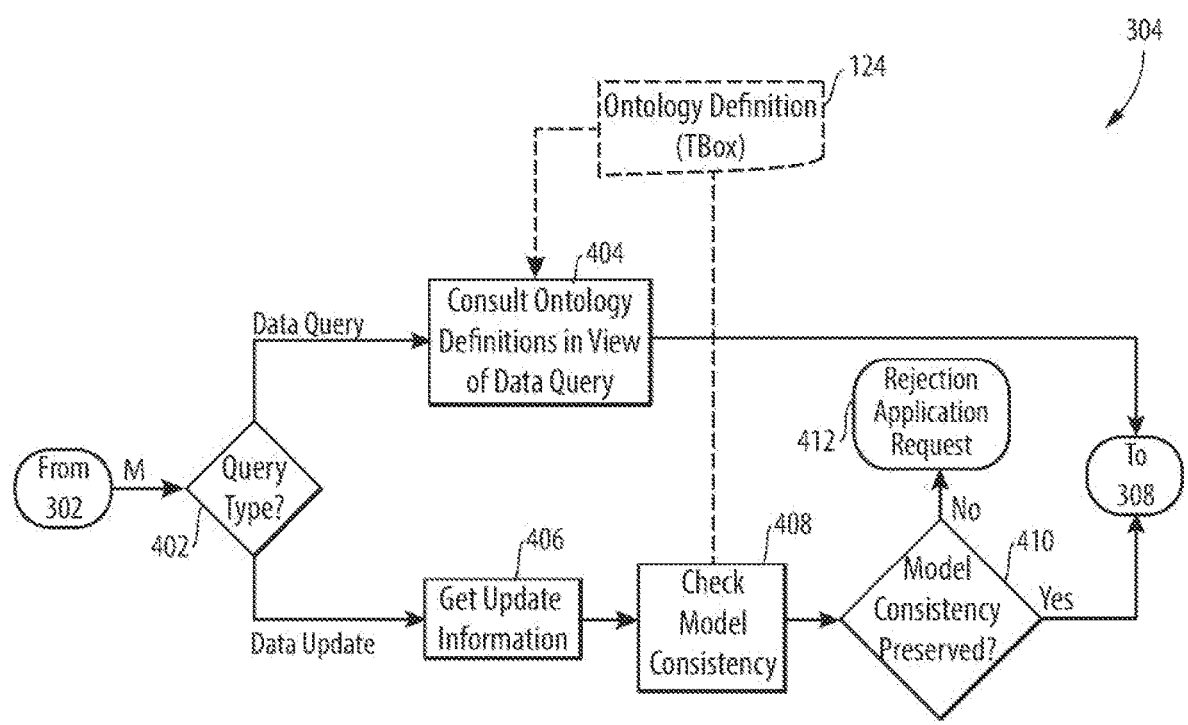
FIG. 4 is a flow diagram of an example method of processing an application request when the application request is a request for data manipulation, in accordance with embodiments of the disclosure.

With reference to FIG. 4, a flow diagram is shown of block 304 which is executed when an application request is a request for data manipulation. At block 402, a determination is made regarding the type of request requested by the application request. If it is determined that the application request requests querying data, the method continues at block 404, after which the method continues at block 308. If it is determined that the application request requests updating data, the method continues a block 406, after which the method continues at block 408.

Examples of application requests that query data include, but are not limited to, a request to get information about a structure and constraints of a specified class, get a list of instances of a specified class, and get details of a specified instance. Examples of application requests that request updating data include, but are not limited to, a request to create a new instance of a specific class by providing details for the instance, to update details of an existing instance, and to delete one or more existing instances.

At block 404, when it is determined that the application request is a data query, the ontology definitions are consulted in view of the data query. The application request includes query information as required for each query type. Different types of data queries can require different query information. For example, ontology model and class identifiers are required as query information for queries that request structure of a class. The ontology definitions, represented conceptually as ontology definitions (Tbox) 124 shown by a dotted box, are consulted in view of the query information in the data query. Actually, the ontology definitions 124 stored in ontology store 122 are consulted. The correctness of information in the application request is then checked against the ontology definitions, for example, when required, an ontology model identifier provided with the application request must exist within the ontology definitions. The method continues at blocks 308 and 310 as described with respect to FIG. 3.

At block 406, when it is determined that the application request is a data update, update information in the application request is obtained. The application request includes update information as required for each data update request type. Different types of data update requests can require different update information. For example, ontology model and class identifiers are required for creation of a new instance of a class, in addition to information specified within the class's structure and constraints. The method continues at block 408, at which model consistency is checked, which is shown and described in greater detail with regards to FIG. 5. The method continues at block 410, in which it is determined whether output from block 408 indicates that model consistency is preserved. If the determination at block 410 is that model consistency is not preserved, then at block 412 the application request is rejected. If the determination at block 410 is that model consistency is properly preserved, then the method continues at blocks 308 and 310 as described with respect to FIG. 3 in which the semantics query is generated using the update information or the query information.

Figure 5:
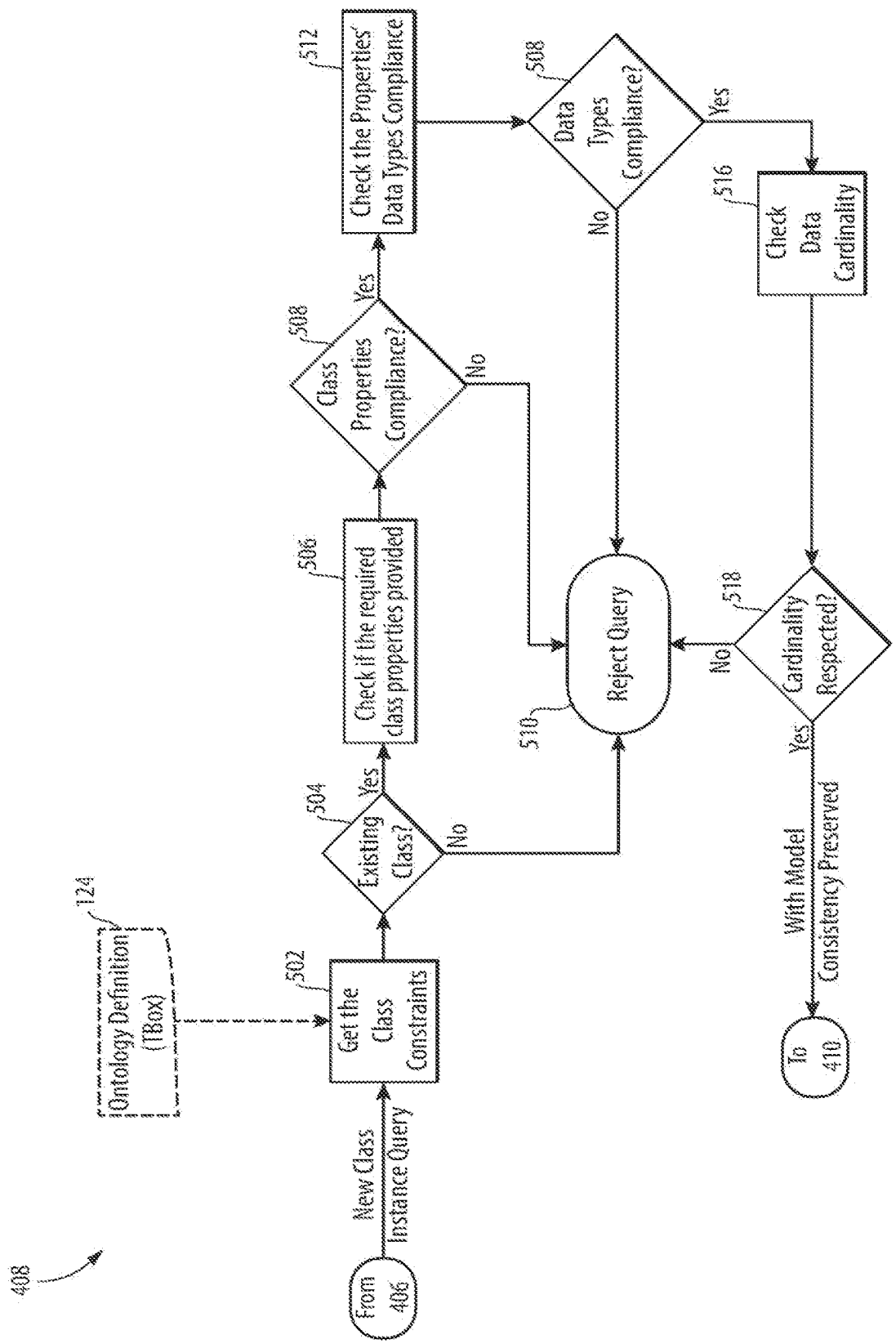
FIG. 5 is a flow diagram of an example method of checking consistency of the application request with the definition for an ontology mode, in accordance with embodiments of the disclosure.

With reference to FIG. 5, an example method is shown for block 408, namely a method of checking consistency of the application request with the definition for an ontology model. In the example shown, the application request has been determined at block 406 to be a data update, and is further treated as a request to instantiate a new class. The disclosure is not limited to only this type of data update, rather this example is used for illustration purposes. The application request in this example includes new instance information, including identifiers of the ontology model and the class for which an instance is requested to be created, in addition to information requested by the class's constraints. At block 502, the ontology definitions 124 are consulted to obtain class constraints defined in the specified ontology model for the specified class. At block 504, a determination is made whether a class identified by the application request is an existing class defined by the ontology definition that corresponds to an ontology being used by the application request. If the determination at block 504 is that the class identified by the application request is not an existing class, the application request is rejected at block 510. If the determination at block 504 is that the class identified by the application request is an existing class, the method continues at block 506.

At block 506, the new instance information provided by the application request is compared with class properties required by the ontology definition. At block 508, a determination is made whether the application request is compliant with class properties required by the ontology definition. All required properties' values must be provided with the new instance information to ensure compliance of the application request. Omission of a required property or provision of extra properties not defined in the ontology definition induce noncompliance of the application request. If the determination at block 508 is that the application request is not compliant with the class properties required by the ontology definition, the application request is rejected at block 510. If the determination at block 508 is that the application request is compliant with the class properties required by the ontology definition, the method continues at block 512.

At block 512, the types of the properties' values given in the application request are compared to data types of the class properties as required by the ontology definition. At block 514, a determination is made whether the application request is compliant with the data types required by the ontology definition. Compliance of the application request is determined when all the types of the properties' values in the application request match with the ontology definition, otherwise, it is judged to be noncompliant when the types of one or more property values do not match with the ontology definition. If the determination at block 514 is that the data type(s) used in the application request are not compliant with the ontology definition, the application request is rejected at block 510. If the determination at block 514 is that the data type(s) used by the application request are compliant with the ontology definition, the method continues at block 516.

At block 516, the properties' values given in application request are compared to value's cardinalities required by the ontology definition. At block 518, a determination is made whether the application request is compliant with the data cardinality requirements of the ontology definition. The compliance of the application request is determined when the number of the provided values for each property match the expected cardinality specified in the ontology definition. The application request is judged noncompliant when the number of values of at least one property is greater or lower than the expected number of values specified in the ontology definition. If the determination at block 518 is that the application request is not compliant with the cardinality requirements of the ontology definition, the application request is rejected at block 510. If the determination at block 518 is that the application request is compliant with the cardinality requirements of the ontology definition, block 306 outputs a result that model consistency was confirmed, and the method continues at block 410 of FIG. 4.

Figure 6:
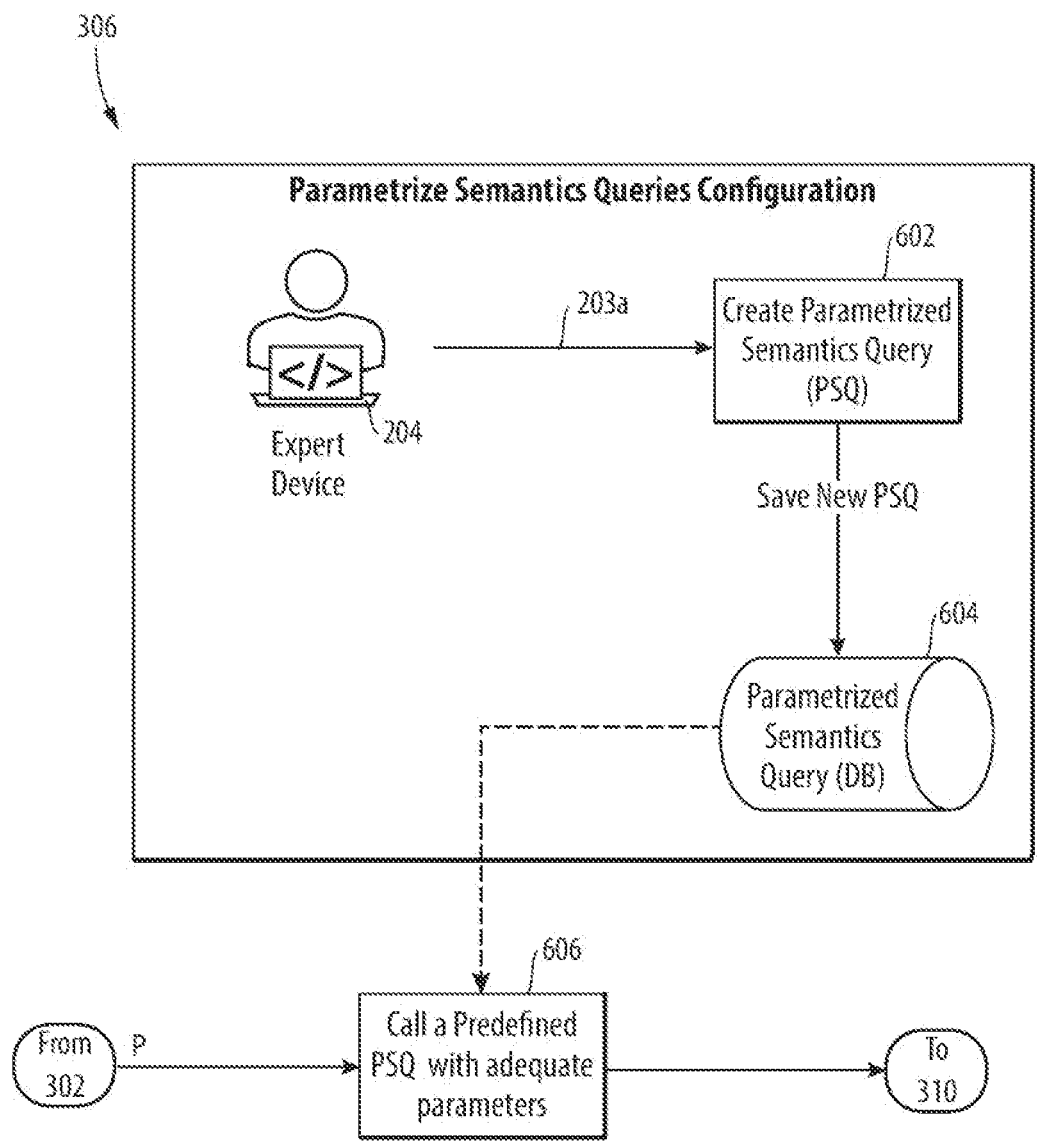
FIG. 6 is a flow diagram of an example method of processing an application request when the application request is a request for parameterization of a semantics query, in accordance with embodiments of the disclosure.

FIG. 6 is a flow diagram is shown of block 306 which is executed when an application request is a request for parameterization of a semantics query. At block 602, templates for parametrized semantic queries (PSQs) are received (e.g., via communications link 203*a*) from an expert device 204 and stored in parametrized semantic queries database 604. Parametrized semantics database 604 can be included in or accessible by ontology API component 102. Each template includes multiple fields, wherein each field is a placeholder for a particular piece of information that will be needed for the semantics query. Each template is configured to be compatible with a specific ontology definition.

At block 606, the application request is received after having been recognized at block 302 as being a request for parametrization of a semantics query. The application request can be in varied formats, such as a natural language query submitted by a user, an HTTP query submitted by a web-based application, or a query in a format that is particular to the application being used. The application request is parsed, and based on results of the parsing, parametrized semantics database 604 is consulted for selecting a specified template. The selected template is completed by extracting parameters included in the application request and inserting them into the template. Each parameter is inserted in a placeholder field having the name of the parameter. The completed template is submitted to block 310, shown in FIG. 3.

Potential advantages are gained by providing access to ontology storage system 104 to users and developers that submit application requests, as well as to domain and ontology experts that dynamically update ontology definitions of ontology models. This enables the ontology storage system to not become obsolete.

Further potential advantages can be obtained by configuring ontology API component 102 to have the ability to receive application requests from applications, as well as to have access to the most current ontology definitions associated with stored ontology models. In this way, even without users and developers having knowledge about updates to ontology definitions, applications developed and used by the users and developers can access stored ontology models based on their most current ontology definitions.

Further potential advantages can be obtained by configuring ontology API component 102 to have the ability to access the ontology definition of an identified ontology, and check applications requests from users and/or developers requesting updates to an ontology model for consistency with an ontology definition of the ontology model. This potentially obviates the need for ontology storage system 104 to have a reasoning engine, allowing for a lighter ontology storage system 104 (relative to conventional ontology store that has a reasoning engine) that can be embedded into a low-power device, such as an appliance, an edge device, a gateway device, etc.

Further potential advantages can be obtained by configuring ontology API component 102 to have the ability to generate semantics queries based on content of a received application request. In this way, the application, its user, and its developer, may not need to know how to generate a semantics query.

Further potential advantages can be obtained by configuring ontology API component 102 to have the ability to access parametrized semantics queries, to parse a received applications request, populate a selected parametrized semantics query with data parsed from the applications request, and use the parametrized semantics query to generate a semantics query to a semantics endpoint of the ontology storage system 104.

Figure 7:
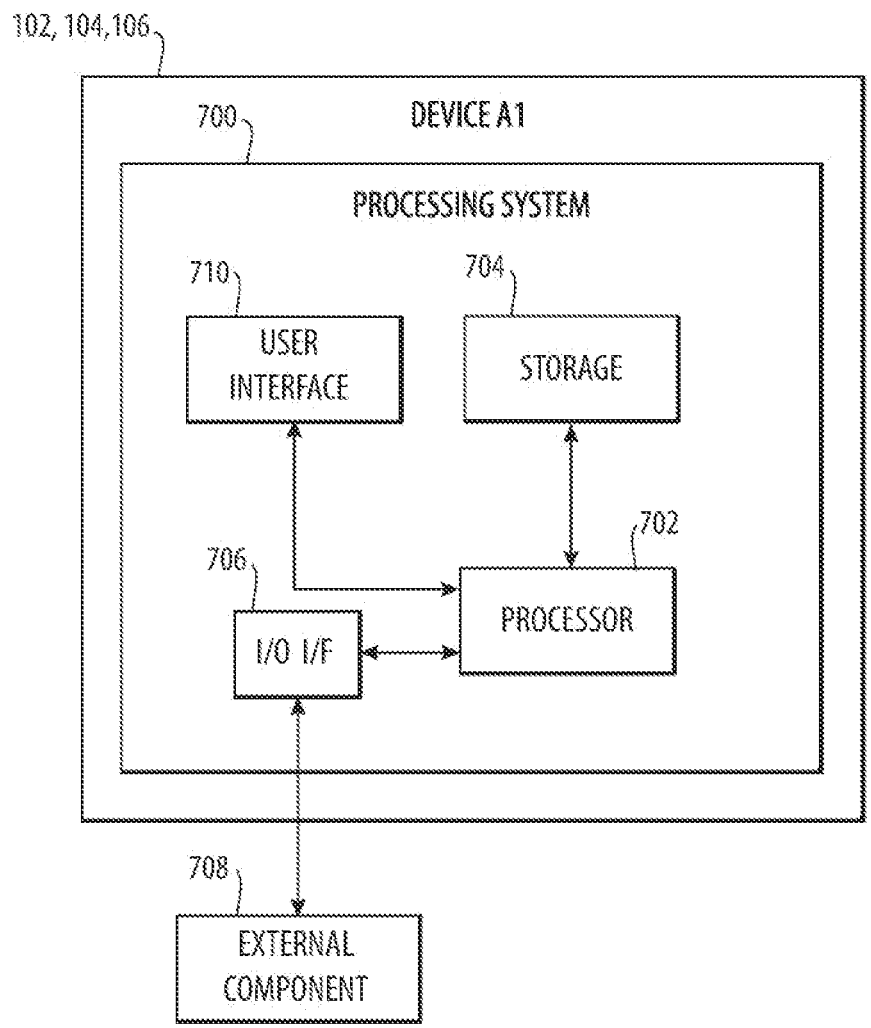
FIG. 7 is a block diagram of an exemplary computer system that implements components of the ontology system shown in FIG. 1, in accordance with embodiments of the disclosure.

With reference to FIG. 7, a block diagram of an example computing system 700 is shown, which provides an example configuration of ontology system 100, such as ontology API component 102 and ontology storage system 104. Additionally, all or portions of the processing components of ontology system 100 could be configured as software, and computing system 700 could represent such portions. Computing system 700 is only one example of a suitable system and is not intended to suggest any limitation as to the scope of use or functionality of embodiments of the disclosure described herein. Computing system 700 can be implemented using hardware, software, and/or firmware. Regardless, computing system 700 is capable of being implemented and/or performing functionality as set forth in the disclosure.

Computing system 700 is shown in the form of a general-purpose computing device. Computing system 700 includes a processing device 702, memory 704, an input/output (I/O) interface (I/F) 706 that can communicate with an internal component, such as a user interface 710 (e.g., for implementing interface 110 shown in FIG. 1), and optionally an external component 708.

The processing device 702 can include, for example, a programmable logic device (PLD), microprocessor, DSP, a microcontroller, an FPGA, an ASIC, and/or other discrete or integrated logic circuitry having similar processing capabilities.

The processing device 702 and the memory 704 can be included in components provided in the FPGA, ASIC, microcontroller, or microprocessor, for example. Memory 704 can include, for example, volatile and non-volatile memory for storing data temporarily or long term, and for storing programmable instructions executable by the processing device 702. Memory 704 can be a removable (e.g., portable) memory for storage of program instructions. I/O I/F 706 can include an interface and/or conductors to couple to the one or more internal components 710 and/or external components 708.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of ontology system 100 may be implemented or executed by one or more computer systems, such as a microprocessor. Each computer system 700 can be included within processing components of ontology system 100, or multiple instances thereof. In the example shown, computer system 700 is embedded in computing devices of ontology system 100. In various embodiments, computer system 700 may include one or more of a microprocessor, an FPGA, application specific integrated circuit (ASIC), microcontroller. The computer system 700 can be provided as an embedded device.

Computer system 700 is only one example of a suitable system and is not intended to suggest any limitation as to the scope of use or functionality of embodiments of the disclosure described herein. Regardless, computer system 700 is capable of being implemented and/or performing any of the functionality set forth hereinabove.

Computer system 700 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:
1. A method for interfacing with an ontology store, the method comprising:
   receiving, by an application program interface (API) that is remote from the ontology store, from a requesting application, a request that specifies an ontology model and one or more parameters defining attributes of an instantiated ontology object;
   accessing the ontology store, wherein the ontology store stores a plurality of ontology models, the ontology store further stores in association with each ontology model a dynamic definition that is modifiable over time, wherein the definition defines classes of the ontology model and relationships between the respective classes;
   identifying an ontology model in the accessed ontology store that corresponds to the ontology model specified;
   selecting a semantic query template from at least one semantic query template that is consistent with a definition of the identified ontology model; and
   inserting one or more parameters into the selected semantic query template as allowed by the template;
   manipulating the identified ontology model based on the identified ontology model's one or more parameters and based on the most current definition of the ontology model;
   generating a semantics query for accessing the ontology model that was identified, the semantics query being based on the one or more parameters specified in the request;
   submitting the semantics query to and receiving query results from the ontology store,
   wherein submitting the semantics query to the ontology store includes submitting to the ontology store the selected semantic template with the one or more parameters inserted; and
   returning the query results to the requesting application.

2. The method of claim 1, wherein the request received is a request to access one or more classes and/or objects of the ontology model specified by the ontology model and the one or more parameters, and manipulating the ontology model includes using the request to identify one or more instantiated classes and/or objects that correspond to the ontology model and the one or more parameters specified by the request.

3. The method of claim 1, wherein the request received is a request to update one or more of classes, constraints, and/or data of the identified ontology model based on the ontology model and the one or more parameters specified by the request, and manipulating the identified ontology model comprises determining whether the identified ontology model and the one or more parameters specified by the request are consistent, wherein submitting the semantics query to the ontology store is performed only upon determining that the identified ontology model and the one or more parameters specified by the request are consistent.

4. The method of claim 3, wherein the one or more parameters specified by the request include one or more specified classes, specified properties of the one or more specified classes, types of data associated with the specified ontology model, and cardinality of multiple classes of the one or more specified classes, wherein determining whether the request and a most current definition for the identified ontology model are consistent includes:
   accessing the definition associated with the identified ontology model; and
   determining at least one of:
      whether the one or more specified classes exist in the identified ontology model, whether the specified properties of the one or more specified classes are compliant with properties of the classes of the identified ontology model, whether the specified types of data stored of the specified ontology model are compliant with types of data associated with the identified ontology model, and whether cardinality of multiple classes of the one or more specified classes is compliant with cardinality of multiple classes of the identified ontology model.

5. The method of claim 1, wherein the ontology store receives an update to the definition of one or more of the plurality of ontology models stored in the ontology store and/or an addition of an ontology definition to the ontology store, wherein in response to a request to access the specified ontology model and/or populate the specified ontology model, the definition related to the identified ontology model is extracted.

6. The method claim 1, wherein the semantics query is a Sparql query and the semantics query is submitted to a Sparql endpoint of the ontology store.

7. The method of claim 1, wherein the request received by the API is formatted in natural language.

8. The method of claim 1, wherein the ontology store is executed by an embedded device.

9. The method of claim 1, further comprising executing the API by a web server or a personal device.

10. The method of claim 1,
wherein receiving at least one semantic query template comprises: receiving the at least one semantic query template by the API from an expert entity, each template of the at least one template being configured to be consistent with a definition of a corresponding ontology model, wherein the template has placeholders configured to allow only parameters consistent with the corresponding ontology model to be inserted into the placeholders.

11. The method of claim 1, further comprising converting the query results to an open standard file format and/or data interchange format, and the query results are returned to the requesting application as converted.

12. An interface system, the interface system comprising:
a memory configured to store a plurality of programmable instructions; and
a processing device in communication with the memory, wherein the processing device, upon execution of the plurality of programmable instructions is configured to:
receive from a requesting entity a request that specifies an ontology model and one or more parameters defining attributes of an instantiated ontology object;
access the ontology store, wherein the ontology store stores a plurality of ontology models and a dynamic definition that is modifiable over time associated with each ontology model, wherein the definition defines classes of the ontology model and relationships between the respective classes;
identify an ontology model in the accessed ontology store that corresponds to the ontology model specified;
select a semantic query template from the at least one semantic query template that is consistent with the definition of the identified ontology module; and
insert the one or more parameters into the selected semantic query template as allowed by the template;
manipulate the identified ontology model based on the identified ontology model's one or more parameters;
generate a semantics query for accessing the ontology model that was identified, the semantics query being based on the one or more parameters specified in the request;
submit the semantics query to the ontology store,
wherein submitting the semantics query to the ontology store includes submitting to the ontology store the selected semantic template with the one or more parameters inserted;
receive query results for the semantics query from the ontology store; and
return the query results to the requesting entity.

13. The interface system of claim 12, wherein the request received is a request to access one or more classes and/or objects of the ontology model specified by the ontology model and the one or more parameters, and manipulating the ontology model includes using the request to identify one or more instantiated classes and/or objects that correspond to the ontology model and the one or more parameters specified by the request.

14. The interface system of claim 12, wherein the request received is a request to update one or more of classes, constraints, and/or data of the identified ontology model based on the ontology model and the one or more parameters specified by the request, and manipulating the identified ontology model comprises determining whether the identified ontology model and the one or more parameters specified by the request are consistent, wherein submitting the semantics query to the ontology store is performed only upon determining that the identified ontology model and the one or more parameters specified by the request are consistent.

15. The interface system of claim 14, wherein the one or more parameters specified by the request include one or more specified classes, specified properties of the one or more specified classes, types of data associated with the specified ontology model, and cardinality of multiple classes of the one or more specified classes, wherein determining whether the request and the identified ontology model are consistent includes:
accessing the definition associated with the identified ontology model; and
determining at least one of:
whether the one or more specified classes exist in the identified ontology model, whether the specified properties of the one or more specified classes are compliant with properties of the classes of the identified ontology model, whether the specified types of data stored of the specified ontology model are compliant with types of data associated with the identified ontology model, and whether cardinality of multiple classes of the one or more specified classes is compliant with cardinality of multiple classes of the identified ontology model.

16. The interface system of claim 12, wherein the ontology store receives an update to the definition of one or more of the plurality of ontology models stored in the ontology store and/or an addition of an ontology definition to the ontology store, wherein in response to a request to access the specified ontology model and/or populate the specified ontology model, the processing device, upon execution of the plurality of programmable instructions is configured to extract the definition related to the identified ontology model.

17. The interface system of claim 12, wherein the ontology store is executed by one or more embedded devices and/or the processing system is an embedded device.

18. An ontology store comprising:
a memory configured to:
store a plurality of programmable instructions; and store a plurality of ontology models, each ontology model having an associated dynamic definition that is modifiable over time, wherein the definition defines classes of the ontology model and relationships between the respective classes; and
a processing device in communication with the memory, wherein the embedded processing device, upon execution of the plurality of programmable instructions is configured to:
receive a request for a definition associated with an ontology model identified in the request;
respond to the request for the definition with the definition requested;
select a semantic query template from the at least one semantic query template that is consistent with the definition of the identified ontology module; and
insert one or more parameters into the selected semantic query template as allowed by the template;
receive a semantics query that is based on a consistency check performed using the requested definition;
process the semantics query,
wherein processing the semantics query to the ontology store includes submitting to the ontology store the selected semantic template with the one or more parameters inserted; and
output a response to the semantics query as processed.

19. The ontology store of claim 18, wherein the processing device, upon execution of the plurality of programmable instructions is further configured to:
receive an update request with an updated version of a definition for an identified ontology model stored by the memory; and
store the updated version of the definition in association with the identified ontology model in response to the update request.

20. The ontology store of claim 18, wherein the processing device is a low-power embedded processing device.

* * * * *